US005588138A

United States Patent [19]
Bai et al.

[11] Patent Number: 5,588,138
[45] Date of Patent: Dec. 24, 1996

[54] DYNAMIC PARTITIONING OF MEMORY INTO CENTRAL AND PERIPHERAL SUBREGIONS

[75] Inventors: Baocheng Bai, Havertown; Mahmut Guner, Landenberg; Duojia Lu, Norristown; David A. Rosenblitt, Unionville; Kaaren L. Stuck, West Chester, all of Pa.

[73] Assignee: Gestalt Technologies, Incorporated, Landenberg, Pa.

[21] Appl. No.: 598,401

[22] Filed: Feb. 8, 1996

Related U.S. Application Data

[63] Continuation of Ser. No. 141,778, Oct. 22, 1993, abandoned.
[51] Int. Cl.⁶ ..................................................... G06F 12/02
[52] U.S. Cl. .............................. 395/497.04; 395/497.01; 395/670; 364/DIG. 1
[58] Field of Search ..................................... 395/275, 400, 395/425, 650, 700, 165, 497.01, 497.04; 364/DIG. 1

[56] References Cited

U.S. PATENT DOCUMENTS

| | | | |
|---|---|---|---|
| 4,300,192 | 11/1981 | Couleur et al. | 395/480 |
| 4,471,457 | 9/1984 | Videki, II | 395/834 |
| 4,843,541 | 6/1989 | Bean et al. | 395/856 |
| 5,117,350 | 5/1992 | Parrish et al. | 395/401 |
| 5,129,088 | 7/1992 | Auslander et al. | 395/700 |
| 5,317,706 | 5/1994 | Pechter | 395/402 |
| 5,325,526 | 6/1994 | Cameron et al. | 395/650 |

OTHER PUBLICATIONS

D. J. Challab, "Elastic Memory: Buddy Systems Interface", Software—Practice and Experience, vol. 18(12), Dec. 1988, pp. 1139–1155.

G. Dewan and V. S. S. Nair, "A Case for Uniform Memory Access Multiprocessors", Association for Computing Machinery Computer Architecture News, Sep. 1993, pp. 20–26.

W. G. Levelt, M. F. Kaashoek, H. E. Bal and A. S. Tanenbaum, "A Comparison of Two Paradigms for Distributed Shared Memory", IEEE Software—Practice and Experience, vol. 22(11), Nov. 1992, pp. 985–1010.

G. Ramanathan and J. Oren, "Survey of Commercial Parallel Machines", Association for Computing Machinery Computer Architecture News, Jun. 1993, pp. 13–33.

*Primary Examiner*—Tod R. Swann
*Assistant Examiner*—James Peikari
*Attorney, Agent, or Firm*—Crowell & Moring

[57] ABSTRACT

A distributed memory management system which provides a novel usage of computer resources. Unlike memory management in conventional computers, memory management in the present invention is distributed, to avoid having data transfer requests wait in line for a centralized memory controller. Individual processes partition logical memory into layers of variable-sized subregions, then allocate these subregions for private use by individual processes. Within each partition, a process may use memory without concern for the activities of other processes. The regions are partitioned into sub-regions, and always include a central subregion C, and four peripheral subregions denoted west (W), south (S), east (E) and north (N). Only the central subregions are ever written to directly from outside the memory. Peripheral regions must first be partitioned before data can be written into their respective central regions.

27 Claims, 11 Drawing Sheets

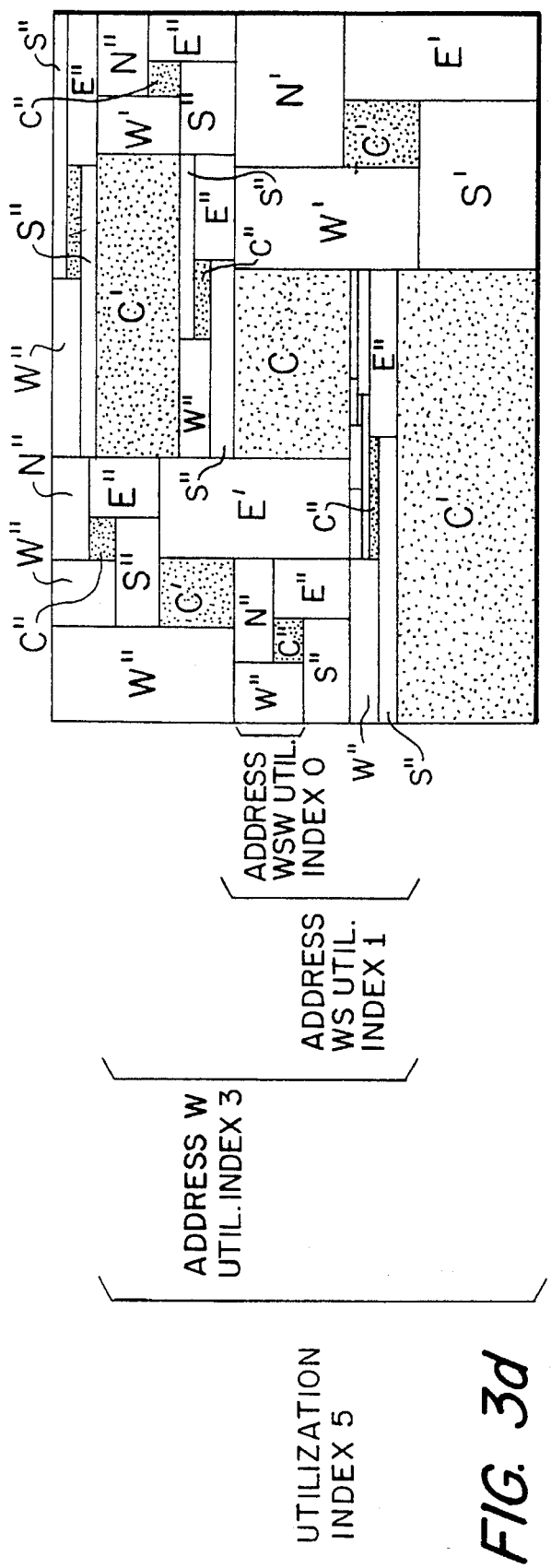
FIG. 3d
FIG. 4
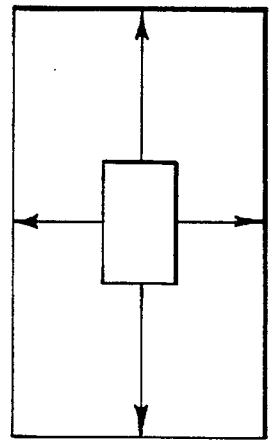
FIG. 6
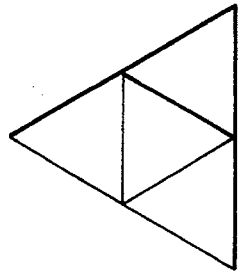
FIG. 5

UTILIZATION INDEX 0
⊢─────────────────────────────────────────────────⊣R
*FIG. 9a*
UTILIZATION INDEX 1
C⊢▒▒┤W │ S │ E │ N │R
*FIG. 9b*
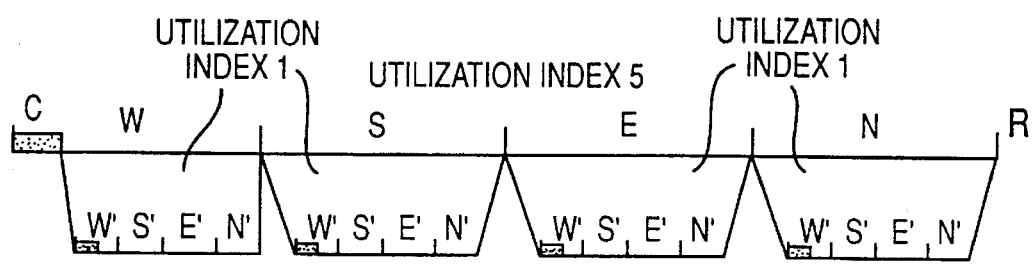
*FIG. 9c*
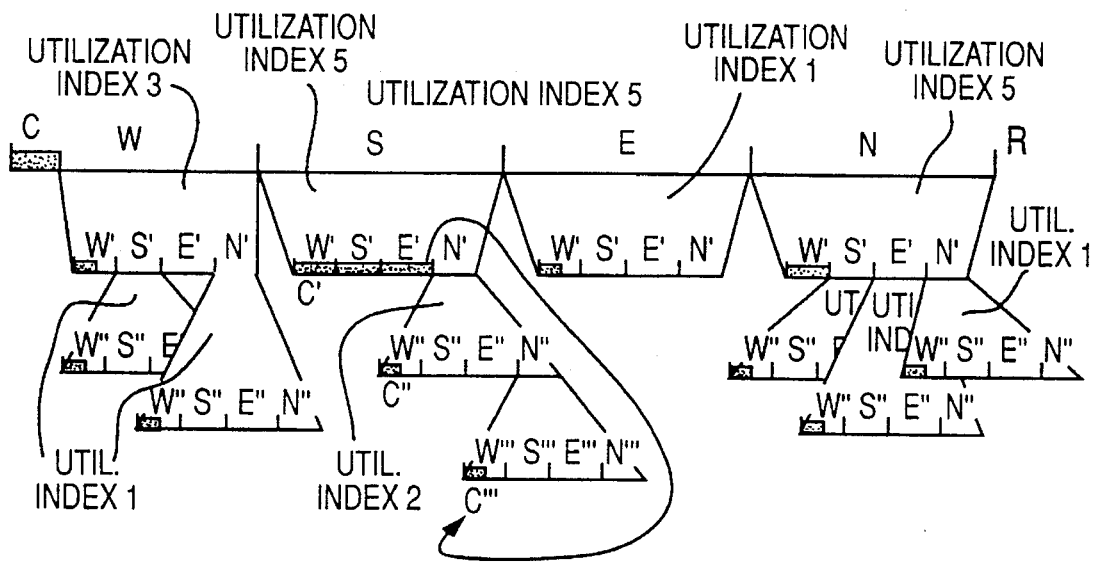
*FIG. 9d*

DYNAMIC PARTITIONING OF MEMORY INTO CENTRAL AND PERIPHERAL SUBREGIONS

This is a continuation of application Ser. No. 08/141,778 filed on Oct. 22, 1993 now abandoned.

BACKGROUND OF THE INVENTION

1. Field of the Invention

The present invention relates to systems for managing computer memories, to computer memories and to computer systems.

2. Background

The Need for Memory Management

Every computer's processor requires memory and communications (input/output) interfaces to the various memory and communications devices in the processor's physical environment (e.g., these interfaces may correspond to specific pins on a processor chip). A processor's operating system is a software module that enables the processor to adapt to, and work within its physical environment. A multi-tasking operating system simulates the effect of multiple processors executing concurrently, although in reality, there is only a single processor. These simulated processors are typically called processes.

Resource management is required whenever resources are shared among multiple processes (or processors), in order to schedule and synchronize the use of these shared resources (e.g., allocating and freeing memory regions), to avoid any inconsistent use of these resources. If memory is such a shared resource, then memory management is required.

The Centralized Memory Management Bottleneck

Conventional multi-tasking operating systems contain a memory manager module to perform memory management. Using this approach, processes cannot access memory directly, but must issue requests to the memory manager, as shown in FIG. 1. The memory manager is a centralized bottleneck resource because there will be delays to use memory when the number of concurrent requests is large, due to the inevitable queuing of requests. The magnitude of this performance degradation is proportional to the number of processes concurrently seeking to use memory. This performance bottleneck is most severe for multiprocessor computers (computers with more than one physical processor). Note that this performance degradation is independent of the size of physical memory, since the bottleneck is due solely to centralized control and synchronization. In addition, the failure of a centralized server is often catastrophic, since it alone guarantees smooth running of the overall system.

In the current state-of-the-art, there are two memory management approaches for multiprocessor computers: uniform memory access (UMA) and non-uniform memory access (NUMA). Dewan, G. and Nair, V.S.S., "A Case for Uniform Memory Access Multiprocessors", *Association for Computing Machinery (ACM) Computer Architecture News*, September 1993pp. 20–26. With UMA, a single memory is shared among multiple processors. The KSR1™ computer developed by Kendall Square Research is the most sophisticated UMA computer on the market. Ramanathan, G. and Oren, J., "Survey of Commercial Parallel Machines", *ACM Computer Architecture News*, June 1993pp. 13–33. The KSR1™ is scaleable from 8 to 1088 processors, all sharing a single memory. Specialized hardware support is provided, including a total of 32 megabytes of cache memory local to each processor. Unlike conventional memory, cache memory is content-addressable (and expensive).

Caches enable each processor to keep a private copy of data that the processor is likely to use. This reduces the frequency with which the processor will need to access the shared memory, since many memory references can be satisfied by the cache. Caches are complex to use, due to the difficulty of maintaining the consistency of multiple copies of data, which may be stored in many caches simultaneously. Caches are most effective when programs exhibit locality of reference, which means that the program references memory locations that are close together. Caches are ineffective when there is no locality of reference. Large-scale numerical computing applications tend to exhibit locality of reference (since these applications often sequentially access uniformly structured numerical data), while nonnumerical, input-output intensive applications do not.

With non-uniform memory access (NUMA), each processor has its own memory, and any processor can use another processor's memory. The CM-5™ connection machine developed by Thinking Machines, Inc. is the most sophisticated NUMA computer on the market. Special synchronization hardware is used by the CM-5™ and other NUMA computers. NUMA multiprocessors have a "message-passing architecture" whereby processors send messages to other processors to issue requests for memory.

In both UMA and NUMA computers, operating systems handle memory management, so the centralized bottleneck problem has not been addressed. "Distributed" memory management techniques have only been considered for NUMA computers (out of necessity, since NUMA physical memory is distributed). However, these techniques are implemented primarily in hardware (e.g., memory caches), which do not address the underlying centralized memory management bottleneck. In fact, there is no established approach to "distributed" memory management, in which the centralized bottleneck is eliminated. For example, in the popular shared virtual memory and shared data-object approaches, processes request fixed-size memory regions from a centralized controller. Levelt, W. G., Kaashoek, M. F., Bal, H. E., and Tanenbaum, A. S., "A Comparison of Two Paradigms for Distributed Shared Memory", IEEE Software—Practice and Experience, Volume 22 (11), November 1992pp. 985–1010.

File Systems

Conventional memory managers require a file system to manage the mapping between named files and the memory locations where data is stored, since these memory locations are transient, and may be different each time the file is loaded or saved. The role of the file system is to remember the current location of the file, in both persistent memory devices and real memory. A persistent memory device is a device, such as a floppy disk, hard disk, or magnetic tape, that retains its memory contents (e.g., its contents are not lost when the computer is turned off). When a file is requested by a process, the file is read from persistent memory devices and is loaded into real memory buffers, where it can be accessed by executing processes. When a file is saved by a process, it is written back to the persistent memory devices. Successive reads to file buffers and writes to memory devices may use entirely different memory locations.

Variable-Sized and Expandable Memory Regions

The best previous attempts at providing expandable memory regions, are variations of the "buddy system", which maintains a contiguous memory at the expense of copying memory regions when they lie on the path of growth for some other memory region. Challab, D. J., "Elastic Memory: Buddy Systems Interface", Software—Practice and Experience, Vol. 18(12), December 1988, pp. 1139–1155. This copying results in the overhead of updating references to relocated data (i.e., all addresses pertaining to this moved data must be updated). The buddy system, like every other known memory manager, uses a centralized approach to memory management, where the centralized controller becomes a bottleneck resource.

Address Spaces

The size of a computer's address space limits the size of addressable (and therefore usable) memory. For example, if the address space is 4 Gigabytes, then 4 Gigabytes is the maximum amount of memory that can be addressed, and therefore used. Conventional computers provide a finite, one-dimensional address space, where memory contents can be accessed by specifying an integer address.

SUMMARY OF THE INVENTION

An Analogy: Sand Management at the Beach

The present invention can be illustrated using the analogy of a beach, where a lifeguard manages the use of space by the various beachgoers. Assume that the beach is very crowded, limiting visibility, so beachgoers find it difficult to visually locate free space on the beach. In this hypothetical beach, the lifeguard has sole responsibility for ensuring that beach space is used by beachgoers without conflict (e.g., no two blankets should be touching each other). Each beachgoer must request space from the lifeguard, and must notify the lifeguard when that space is relinquished (e.g., when the beachgoer goes home). Unfortunately, this means that beachgoers will need to wait in line to speak with the lifeguard, since the lifeguard is the only person who can allocate or free beach space. In addition, managing beach space can be complicated, since the beach is large, and the lifeguard must keep track of which areas are in use, and which areas have been relinquished. Thus, the lifeguard sometimes thinks a lot before deciding where to send a new beachgoer. To help reduce this complexity, the lifeguard only allocates space in fixed-size units (e.g., 9 square yards). In short, the lifeguard is a centralized controller, an overloaded bottleneck resource, resulting in delays for service.

The above beach management example is analogous to the way centralized memory management is performed in conventional computers. The present invention is analagous to a different kind of beach, where space is managed in a distributed, rather than a centralized fashion. In this second beach, the lifeguard is not involved in the management of space at all (he or she simply focuses on rescuing drowning swimmers). Instead, the management of space is performed collectively by the beachgoers via judicious placement of maps, indicating which areas are in use, and which areas are free (recall that on a crowded beach, it is difficult to visually locate free space). Unlike ordinary maps, these sand maps are intimately integrated with the terrain they refer to, and are actually part of the beach. The beachgoers are responsible for keeping these maps up-to-date, as they use or relinquish beach space. By reading these maps, beachgoers quickly find an appropriate area to place their blankets. This beach has no centralized bottleneck resource for which beachgoers must wait in line.

In addition to avoiding long lines for the lifeguard, this new beach offers additional flexibility, over and above the first beach. Beachgoers are allowed to reserve areas of arbitrary size, which, if necessary, can be expanded or shrunk. For example, if some beachgoers are joined by some friends, they may want to expand their allocated space so that the friends can stay close by. Or, if some beachgoers in a group decide to leave early, then the group's space can be shrunk, and be made available to other beachgoers.

The present invention is a distributed memory management system which results in a new kind of computer. Unlike conventional computers, memory management is distributed, which avoids waiting in line for a centralized memory controller. Unlike conventional computers, in the present invention memory regions are variable-sized, and may be expanded and shrunk as needed. And unlike conventional computers, in the present invention memory regions are directly addressable, using maps that are integrated with the memory regions they reference.

The above beach analogy is not perfect, and breaks down when the present invention's capability for supporting an orbitrarily expandable expandable address space is included. A more accurate analogy would be an imaginary beach, where space is allowed to grow and shrink, but not just at exterior boundaries of a space, but within the interior as well. To use a dramatic example, an entire new beach could be inserted between any two grains of sand, without disrupting any beachgoers! That is, if a group of friends were playing volleyball in a space that encompassed such grains of sand, they would continue playing and communicating with each other as before, unhindered by the insertion of additional beaches inside their playing field! Similarly, using the present invention, an address space may be arbitrarily expanded, at arbitrary points within its boundaries, without ever relocating data (just as the beach volleyball team never needs to adjust its position, or move its playing field, when the beach expands). The present invention provides an arbitrarily expandable expandable address space, so that arbitrary amounts of memory can be used (in contrast to conventional computers, which may only address, and therefore use, a limited amount of memory).

In addition, the present invention provides a readily expandable address space, so that arbitrary amounts of memory can be used (in contrast to conventional computers, which may only address, and therefore use, a limited amount of memory).

Implementation of the Invention

The present invention is a distributed memory management system that is implemented by the concurrently executing processes that actually use memory. These processes will reserve, partition, expand, shrink, and free memory regions, which span multiple computers, without replication, within an arbitrarily address space. The present invention addressing mechanism is based on dials that are stored within the variable-sized layers of partitioned memory regions which they address. The entire memory is directly addressable using these dials, thereby avoiding the additional indirection and overhead due to a file system. Dials are used to specify arbitrarily-sized paths through arbitrarily-sized memory regions (e.g., regions may be as small as a few words, and as large as four gigabytes, or more).

The present invention provides the following advantages over the state-of-the-art in memory management:

1) Expanding Memory Bandwidth and Increasing Performance via Massive Parallelism: The present invention achieves distribution without using any centralized servers, enabling it to eliminate the bottleneck that characterizes conventional centralized memory management systems. With the present invention, memory is managed not by a centralized controller, but by a collection of concurrent, distributed parallel processes that actually use the memory. In the present invention multiple processes concurrently access memory directly, as shown in FIG. 2. Processes do not need to issue requests to a memory controller, and therefore do not need to wait for a controller's response. Memory access is immediate, since processes never need to wait for a controller to process memory requests. This effectively increases memory bandwidth, or the rate at which memory is used by parallel processes.

The present invention is useful for enhancing the performance both UMA and NUMA multiprocessors. For example, the present invention can enable NUMA multiprocessors to directly access each other's "private" memories, thereby avoiding the delays inherent in a message-passing architecture, which results in a performance bottleneck as message queues become large. In addition, it would also be useful in expanding memory bandwidth over a network of computers, since it enables every process and processor on every computer to have access to the entire network-wide memory, instead of restricting them to memory located in their host computer.

2) No File System: In the present invention, data is directly addressable and is never moved, enabling the present invention to bypass the extra level of indirection imposed by a file system. This enables the present invention to significantly outperform conventional memory managers that use file systems. Every memory region is defined by its unique location in the address space. Memory regions are never mapped into local buffers, so a file system is not needed to remember a transient location for a memory region.

The present invention uses dials to implement its addressing mechanism, which are stored within the variable-sized layers of partitioned memory regions they address. The entire memory is directly addressable using dials, which are used to specify arbitrarily-sized paths through arbitrarily-sized memory region (which may be distributed over multiple computers connected via a network). Processes may use memory without being concerned about which computer actually stores this memory.

3) Variable-Sized, Expandable and Shrinkable Memory Regions: In the present invention, memory regions are variable-sized, and may expand (if a region runs out of space) and shrink (if data within a region is deleted). Unlike the aforementioned "buddy system", the present invention never needs to move any data when a region expands. Therefore, it never needs to update the addresses for moved data.

4) Arbitrarily Expandable Address Space: The present invention supports a readily expandable address space, where relative addresses are used to access data. These relative addresses specify how to navigate through layers of partitioned memory regions, beginning with the region containing the relative address. These relative addresses will typically be smaller than the addresses used by conventional computers. In addition, the present invention can always generate new addresses for new, variable-sized and expandable memory regions without ever moving any existing data. These new memory regions may be placed at arbitrary points within existing memory regions. With the present invention, computers may use arbitrary amounts of memory (in contrast to conventional memory management systems, which may only address, and therefore use, a limited amount of memory).

5) No Replication of Data: The present invention does not replicate data, except as a backup mechanism (e.g., by backing up each node to one local and one remote node) to prepare for inevitable node crashes, thereby eliminating the complexity of maintaining consistent multiple copies of data (e.g., data access is simplified, since data always has a unique address).

6) Increased Robustness and Reliability: The lack of centralized elements guarantees that memory management failures will be localized, resulting in greater reliability than in conventional systems.

7) High Performance for Both Non-Numerical and Numerical Applications: The present invention is equally effective for numerical and non-numerical applications, since its performance does not depend on locality of reference.

Glossary

Absorption of regions occurs when a center region expands by absorbing part or all of one (or more) of its sibling regions. Absorption is the most desirable way to expand a region, since its contiguity is preserved.

An address space limits the size of addressable (and therefore usable) memory. Conventional computers provide a finite, one-dimensional address space, where memory contents can be accessed by specifying an integer address.

A bottleneck resource causes delays in service due to the large demand for that resource.

Caches are content-addressable memories, local to a processor, which reduces the frequency with which the processor will need to access non-local memory, since many memory references can be satisfied by the cache.

The center sub-region is the part of a memory region where useful data is actually stored. When the center overflows, it tries to expand at the expense of its free sibling peripheral sub-regions.

A centralized controller synchronizes the use of common resources.

Concurrent use of memory means that two or more processes may concurrently reserve and utilize memory without any explicit synchronization.

Contiguous regions are physically adjacent (using a one-dimensional view of memory).

A continuation specifies an expansion of a center region to some other region. The continuation is a local continuation if this region is a sibling of the center, and is a remote continuation otherwise.

A depth-first search considers the descendants of a node before considering its siblings. A depth-first search is likely to find a region that is close to the original region R, thereby localizing the regions reserved by a process.

Dials are addressing mechanisms which directly address memory, thereby avoiding the indirection due to a file system.

Directly addressable memory may be addressed directly by processes, without using any file system or memory manager intermediaries, since the location of data never changes.

Distributed systems do not have any centralized elements (these elements, in centralized systems, become bottleneck resources as the system grows in size).

Expandability means that any sub-region should be free to expand within the confines of its parent region, possibly absorbing the entire parent region.

A region may be expanded by either absorbing a sibling region, or by a continuation to a local or remote region.

File systems are needed in conventional memory management systems to remember the current addresses of data, which may be stored at different addresses at different times.

A region is freed when all of its useful data has been deleted.

Homogeneity means that when a memory region is partitioned into sub-regions, the sub-regions must have the same properties as the original region.

An arbitrarily expandable address space is a space wherein relative addresses are used to access data.

Locality of reference occurs when a program's memory references are close together. Caches are most effective when there is locality of reference.

A lock prevents one process from using a resource while another process is using that resource.

The dial map for a region indicates sub-region locations, sizes, and offsets.

Memory bandwidth refers to the rate at which memory is used by processes.

Memory management is required to synchronize the use of shared memory.

A multiprocessor is a computer with more than one physical processor.

A multi-tasking operating system simulates the effect of multiple processors executing concurrently, although in reality, there is only a single processor.

Non-uniform memory access (NUMA), requires each processor to have its own "private" memory, where any processor can use another processor's memory by sending an appropriate message.

Offsets specify how much memory has been actually used by the center sub-region, which is divided into up to four non-contiguous fragments within the peripheral sub-regions, in the one-dimensional implementation.

A one-dimensional representation of memory is provided by conventional operating systems. Thus, the present invention maps its two-dimensional representation of memory to a one-dimensional representation.

An operating system is a software module that enables a processor to adapt to and work within its physical environment.

A region overflows when it runs out of space.

Peripheral regions must be partitioned before they can be used (the center sub-region within the peripheral region will actually store useful data).

A persistent memory device is a device, such as a floppy disk, hard disk, or magnetic tape, that retains its memory contents (e.g., its contents are not lost when the computer is turned off).

A process is the active entity in a computer system, analogous to an executing program, on a real or simulated processor.

Relative addresses specify how to navigate through layers of partitioned memory regions, beginning with the region containing the relative address reference. Relative addresses consist of strings composed of the following characters: P (parent region), N (north sub-region), W (west sub-region), S (south sub-region), E (east sub-region), and C (center sub-region).

Synchronization of a shared resource prevents the resource from being used in inconsistent ways.

The top dial is the dial used by the initial invocation of the search for free memory regions.

A two-dimensional representation of memory represents memory by layers of partitioned rectangular memory regions.

Uniform memory access (UMA) multiprocessors use a single memory that is shared among multiple processors.

The utilization index indicates the number of sub-regions that are actually in use within a given region. The utilization index is compared to the utilization counter when a process searches for a free memory region. Lower utilized regions are examined first, thereby balancing the utilization (and partitioning) of memory regions.

BRIEF DESCRIPTION OF THE DRAWINGS

FIG. 4 shows a simple, one-dimensional view of memory.

FIG. 5 shows the simplest possible two-dimensional (triangular) view of memory, which cannot meet the requirements of the present invention.

FIG. 6 shows the simplest (rectangular) view of memory, which satisfies the requirements of the present invention.

FIG. 9 illustrates a one-dimensional representation of memory corresponding to the two-dimensional representation illustrated in FIG. 3.

DETAILED DESCRIPTION OF THE INVENTION

Partitioning Memory into Multiple Layers

Figure 1:
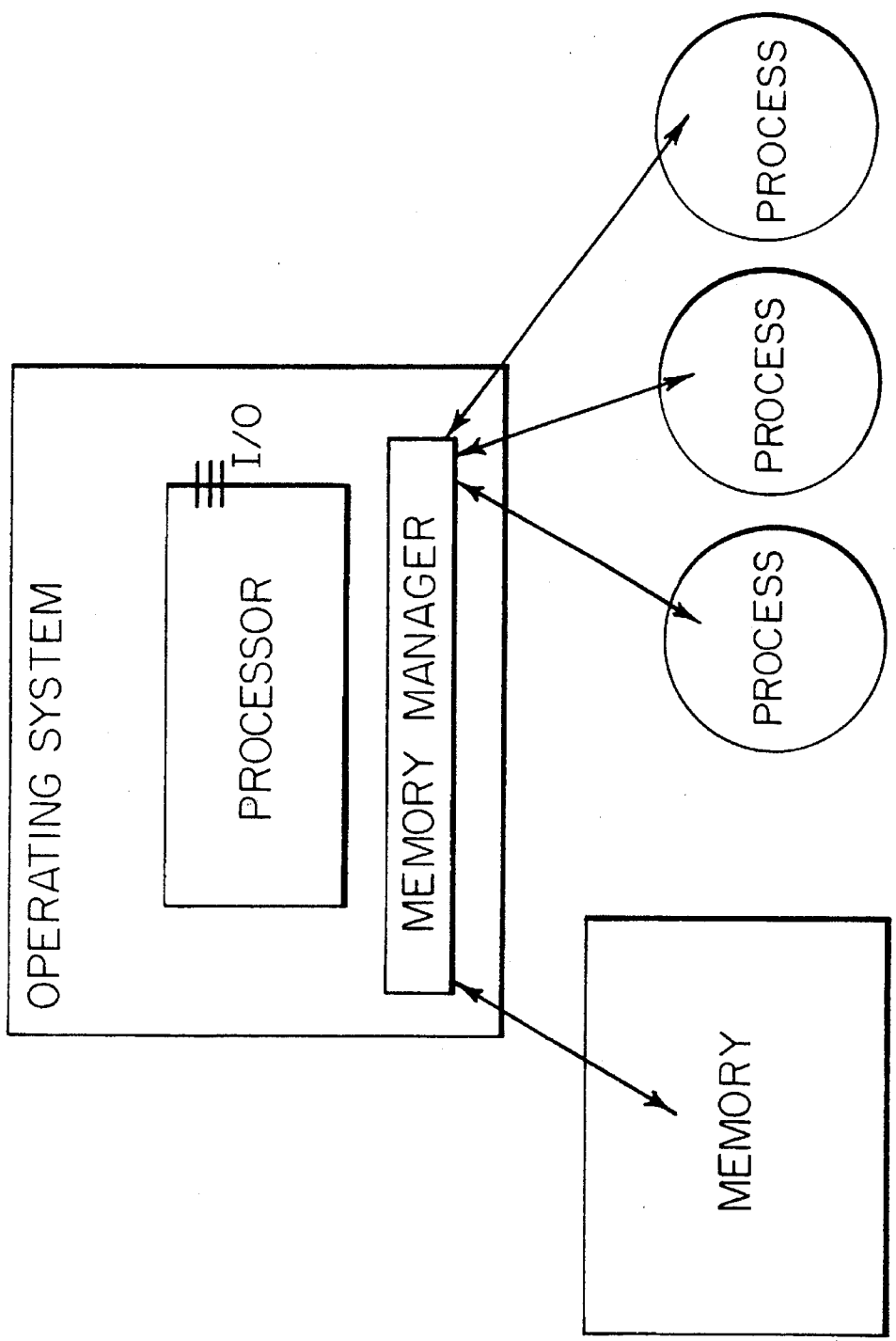
FIG. 1 is a schematic block diagram illustrating the approach to memory management used by conventional computers, wherein processes issue memory requests to a centralized memory manager.
Figure 2:
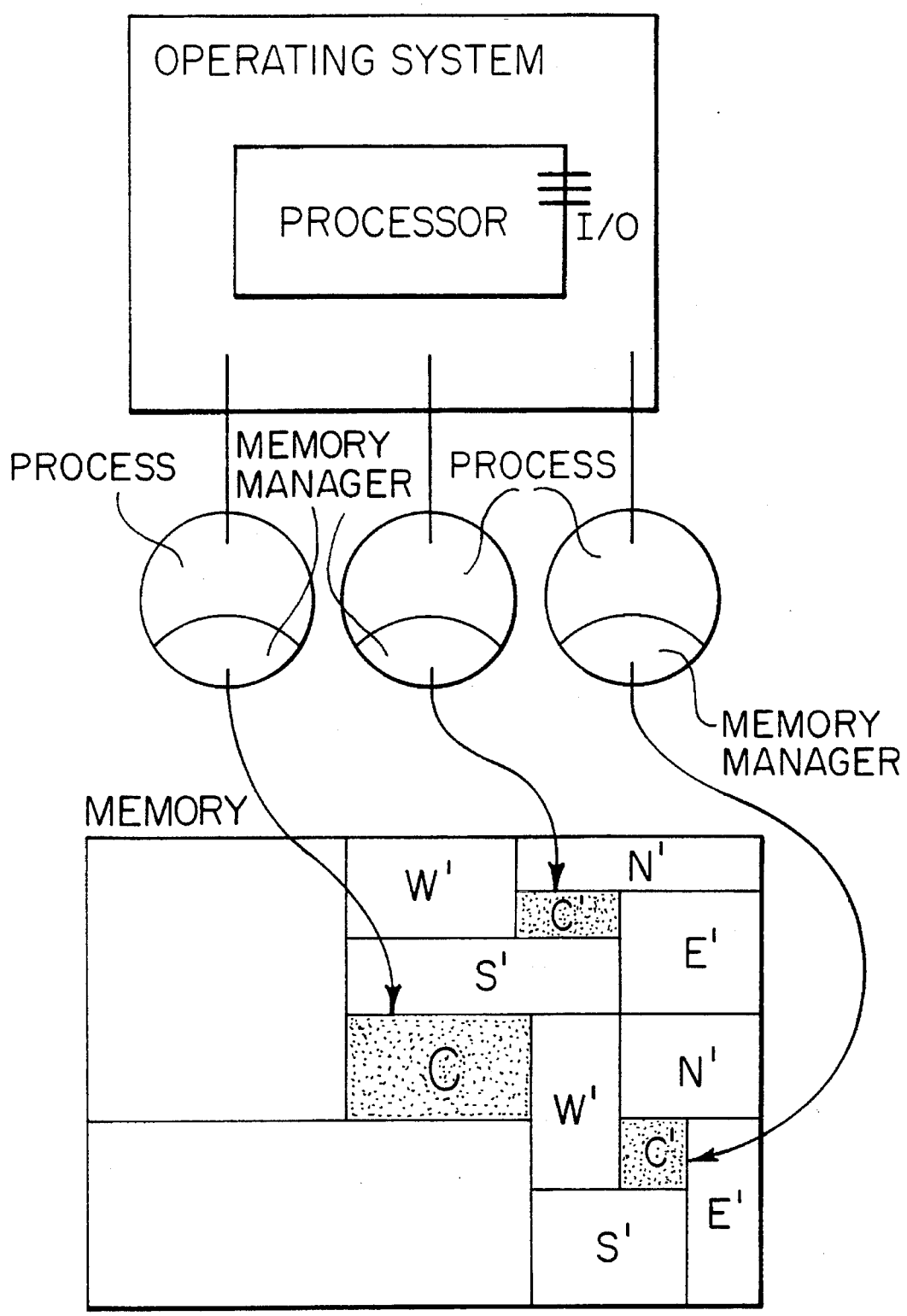
FIG. 2 is a schematic block diagram illustrating the approach to memory management used by the present invention, wherein parallel processes access memory directly, avoiding the centralized memory management.
Figure 3A:
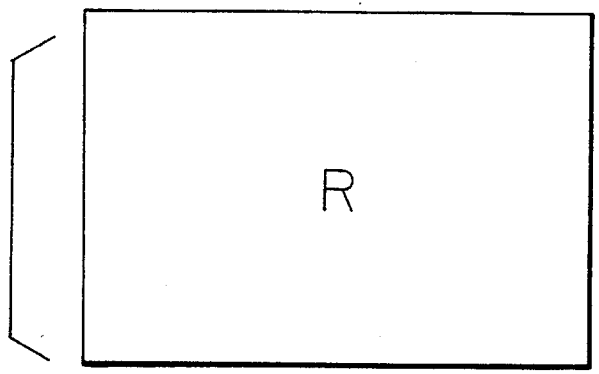
FIG. 3 shows how the present invention partitions memory regions, using a two-dimensional view of memory.
Figure 3B:
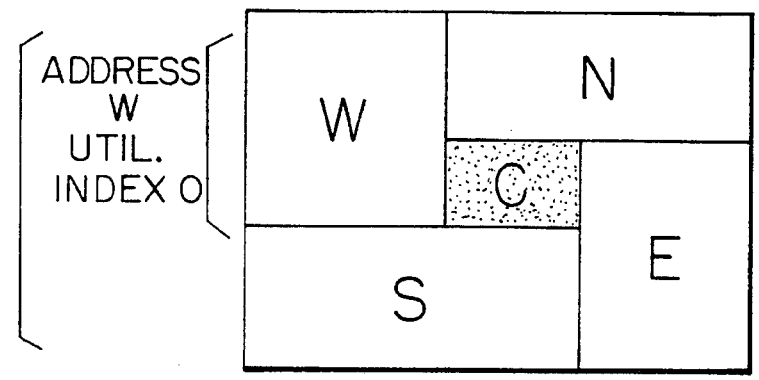

In the present invention, memory is partitioned into layers of sub-regions, and then allocated to individual processes for their private use. The purpose of partitioning memory into private sub-regions (instead of providing one huge, global memory that all processes share) is to enable processes to use memory without needing to explicitly synchronize their memory use with other processes (which would result in significant overhead). Partitioned memory provides clear boundaries that separate the memory used by different processes. Within each partition, a process may use memory without concern for the activities of other processes. The regions are partitioned into sub-regions, which always include a center sub-region, C, and four peripheral sub-regions, which called west, south, east, and north, abbreviated as W, S, E, and N, respectively, as illustrated in FIGS. 3a and 3b (center regions are in black). A new dial will then be created and initialized to control memory use within the overall region. Only the center regions are ever written into directly; peripheral regions must first be partitioned, and then their center sub-regions are written into directly.

Two Representations of Memory

The algorithm uses a two-dimensional representation of memory. However, since the interface to memory (using conventional operating systems) is via a linear, one-dimensional address space, the two-dimensional representation of memory must be converted into a one-dimensional representation. There are many possible ways to achieve this conversion. The conversion from two dimensional memory to one dimensional memory is a "trick" that simulates the effect of two-dimensional memory using one-dimensional memory. The one-dimensional representation may seem strange if one is not first familiar with the two-dimensional representation.

Dials

Every memory region R stores within it a dial D, which is used by multiple concurrent processes to locate free regions of memory.
Dials have two primary functions:
1) To contain the information needed to enable processes to address, reserve, partition, grow, shrink, and free memory regions.
2) To directly address memory, using relative addresses that are composed of a series of dial specifications that define a path through successively partitioned memory regions.

Overview of Algorithm

Figure 12:
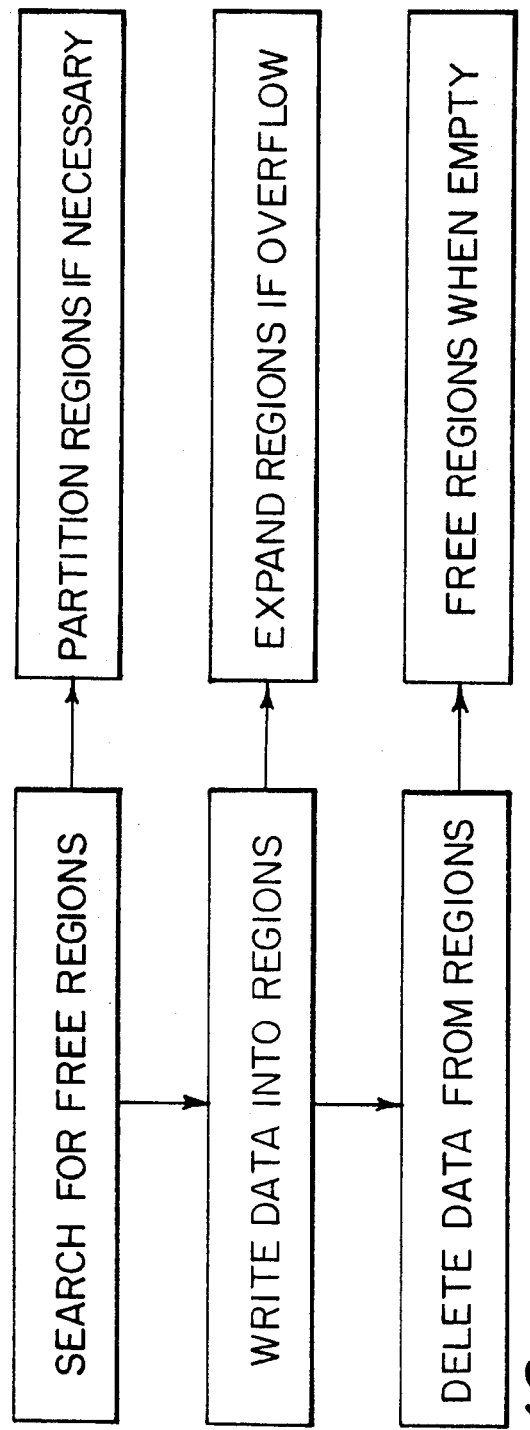
FIG. 12 is an abstract flow chart that shows the three primary activities performed by processes using the present invention.

The distributed memory management algorithm is performed by each of the multiple concurrent processes that use memory. There is no memory controller in the present invention. These processes perform three primary activities, which are described in the following sections, and are summarized in a flow chart in FIG. 12:

Search for free memory regions (and partition these regions if they are peripheral regions)

Write data into these regions (and expand these regions when they overflow)

Delete data from these regions (and free these regions when they become empty)

When searching for free memory regions, beginning with a region R, there are four types of regions a process can reserve:

R itself one of R's immediate sub-regions (R's children)

a descendant region within one of R's sub-regions (R's grandchildren, great-grandchildren, etc.)

a descendant region within an ancestor region of R (R's siblings, nieces and nephews, grand-nieces and grand-nephews, etc.)

Figure 3C:
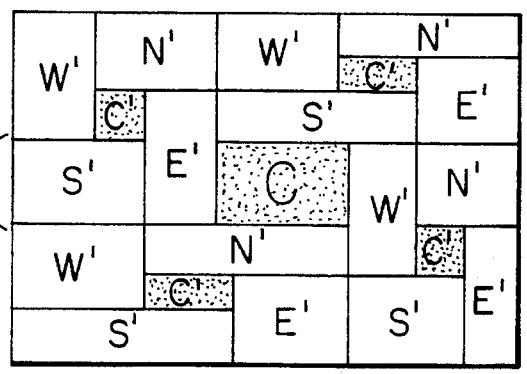
Figure 7A:
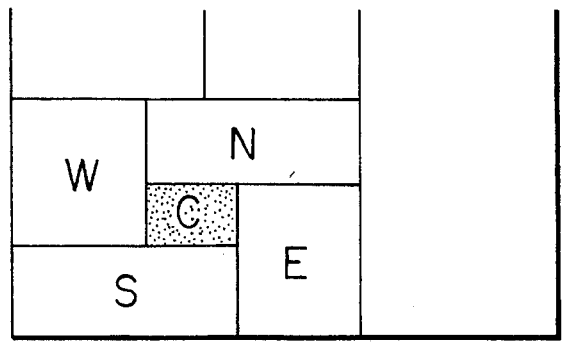
FIG. 7 illustrates, using a two-dimensional view, how a memory region may expand by absorbing free memory from other regions.
Figure 7B:
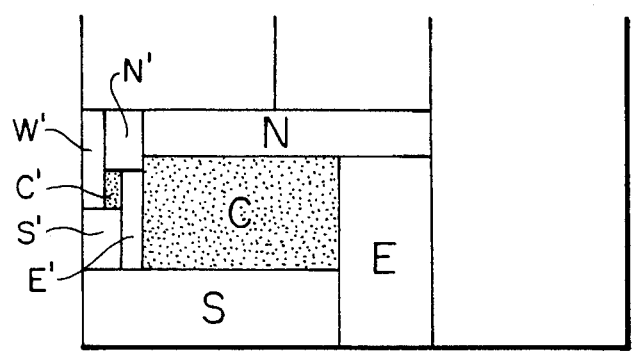
Figure 7C:
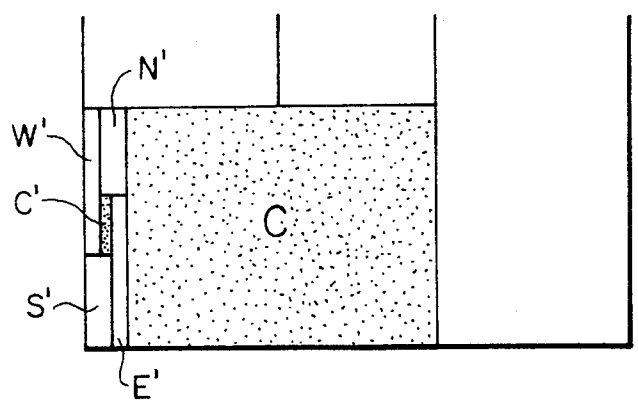
Figure 7D:
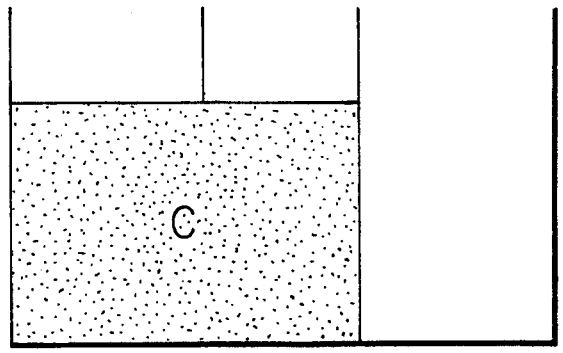

For example, in FIG. 3b, sub-regions W, S, E, and N are the immediate sub-regions (children) of R; in FIG. 3c, sub-regions labeled W', S', E', N', and C' are sub-sub-regions (grandchildren) of R; and in FIG. 3d, sub-regions labeled W", S", E", N", and C" are sub-sub-sub-regions (great-grandchildren) of R.

The search will be recursively invoked on successive memory regions. Each dial associates a utilization index with each of its sub-regions, which determines the order in which these regions will be examined by the search procedure. All of these regions will be examined eventually, unless one of the regions (or its descendants) succeeds, in which case the search immediately terminates with success. The idea is to balance the utilization (and partitioning) of regions by examining lightly utilized regions before examining heavily utilized regions.

If the search fails, it will be attempted again, starting with R's parent region. If this second search fails, then it will be attempted yet again, starting with R's grandparent region, and so on. If all memory regions for the current computer are too small, the search will eventually examine memory regions that reside on other computers. Therefore, the directly addressable memory for each process spans the entire network of computers. The overall search fails only when the entire network of computers runs out of memory.

Once a process P owns a center region C, it may write data into C. If C overflows (e.g., all of C's allocated space is filled with useful data, and P needs to write additional data into C), then C must be expanded. There are two ways of accomplishing this expansion, in order of preference: by absorbing part or all of a free sibling region (preferably adjacent to C), or by specifying a continuation to some other free (non-local) region. P may also delete data from C. If C becomes empty (i.e., C no longer contains any useful data), then C is freed.

The algorithm can also be used to manage distributed memory over multiple computers, where each computer can reserve, partition, expand, shrink, and address memory regions residing on any computer in the network (e.g., that may "belong to" other computers). The trick is to give each computer a finite, yet arbitrarily expandable, address space. Each address space will be a center sub-region within a parent region containing an infinite address space.

For example, beginning with the initial network-wide address space I, the network manager process may reserve an address space in I's center sub-space that is more than adequate for one computer (e.g., four gigabytes). Since I's peripheral sub-spaces are arbitrarily large, they may be partitioned arbitrarily. Thus, the network-wide address space will be partitioned into layers of arbitrarily expandable address spaces.

Data never needs to be moved to new memory locations (unlike conventional systems) because in the present invention addresses (and address spaces) are guaranteed to be unique. Computers will be arranged in a parent-child relationship. The address spaces for child computers are arbitrarily expandable. When computers are removed from the network, their address spaces are freed, and become available for use by new or existing computers.

TWO REPRESENTATIONS OF MEMORY

A Two-Dimensional Representation of Memory

The present invention requires the recursive partitioning strategy to satisfy the following requirements:

1) Concurrency, such that processes may concurrently partition memory into different regions (i.e., the concurrent processes do not need to explicitly synchronize their activities). This means that partitions performed by one process must not affect every other concurrently executing process (i.e., must not require global synchronization). A distributed memory manager that does not support concurrency cannot claim to be of much value, since memory management would then be sequentialized, as in the classical centralized approach.

2) Homogeneity, such that when a memory region is partitioned into sub-regions, the sub-regions have the same properties as the original region. Homogeneous sub-regions may be handled in a uniform manner, which facilitates a distributed approach, since all memory regions, no matter how large or small, or how many times they have been partitioned, can be handled uniformly.

3) Expandability, such that any sub-region is free to expand within the confines of its parent region, possibly absorbing the entire parent region.

These requirements necessitate a partitioning strategy that uses at least two dimensions of memory, and creates at least five sub-regions each time memory is partitioned. A first attempt to use a one-dimensional view of memory, where the partitioning strategy partitions (finite) memory regions into three sub-regions A, B, and C, is shown in FIG. 4.

Concurrency requires that each partition create at least three sub-regions, so that if one sub-region expands, at least one sibling sub-region will be unaffected by that expansion. If there were only two sub-regions, the expansion of one sub-region would be at the expense of the other sub-region, and would therefore require "global" coordination by both sub-regions. Having a third sub-region guarantees that there is always at least one sub-region unaffected by the expansion of an arbitrary sub-region (e.g., A may expand into B without affecting C).

Memory expansion naturally occurs in the direction corresponding to increasing memory addresses. If some sub-regions were forbidden to expand, then the sub-regions would not be homogeneous, since they would not all share the expandability property. However, the combination of homogeneity and expandability are impossible using one-dimensional memory. For example, consider the middle sub-region B. When sub-region B needs to expand, it will grow into sub-region C, if C is free. If C is not empty, then B will try to expand into region A, if A is free. However, B's expansion into A will be in a direction opposite to B's growth into C. This means that memory must be able to expand in two directions, which is most naturally represented using two dimensions. In addition, even if expansion in two directions were allowed using one dimension, homogeneity would be lost, since only B would have that ability, since A and C would only be able to expand in one direction, into B.

First consider the minimal two-dimensional region, the triangle shown in FIG. 5. Homogeneity requires that these triangles be partitioned into similar sub-triangles. The homogeneity constraint requires that sub-triangles must be similar to their parent triangle. Expandability requires that any sub-region be able to expand into the entire parent region. However, unless homogeneity is sacrificed (i.e., unless parent triangles and sub-triangles are allowed to have different shapes), there is no way to partition a triangle into sub-triangles such that any sub-triangle can expand its edges to reach the edges of the parent triangle. Therefore, the partitioning strategy requires regions having at least four edges. It is possible to partition a rectangular region into sub-rectangles, such that the center rectangle can sweep toward any of the parent's four edges, as shown by the arrows in FIG. 6. In the general case, each rectangle would be divided into five sub-rectangles, where the center sub-rectangle can expand toward any or all of the parent rectangle's edges. FIG. 7 illustrates how a center sub-region C may expand by absorbing memory from its free peripheral sibling regions. Also, in FIG. 3d, the south's center has absorbed its western, eastern, and southern siblings, and the north's center has absorbed its western sibling.

Therefore, the minimal partitioning strategy uses two-dimensional memory, and partitions rectangular regions into 5 sub-rectangles. Regions are partitioned into sub-regions, which always include a center sub-region, and four peripheral sub-regions, as illustrated in FIGS. 3a and 3b, which are called west, south, east, and north. The algorithm treats memory as two-dimensional. However, since conventional operating systems (which determine how the computer's address space is structured and used) treat memory as a linear, one-dimensional address space, this two-dimensional representation of memory must be mapped to a one-dimensional representation of memory, as described below.

A One-Dimensional Representation of Memory

The center sub-region tries to expand at the expense of its free sibling peripheral sub-regions. FIG. 8 illustrates one possible one-dimensional representation of memory corresponding to the two-dimensional representation, and illustrates the contiguous expansion of a center region. FIG. 9 illustrates a one-dimensional representation of memory corresponding to the two-dimensional representation illustrated in FIG. 3. FIG. 10 illustrates the non-contiguous expansion of a center region, via local continuations (described below).

Figure 8A:
FIG. 8 illustrates one possible one-dimensional representation of memory corresponding to the two-dimensional representation, and illustrates the contiguous expansion of a memory region.
Figure 8B:
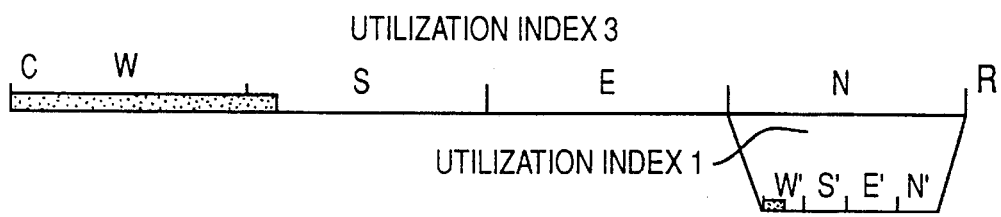
Figure 8C:
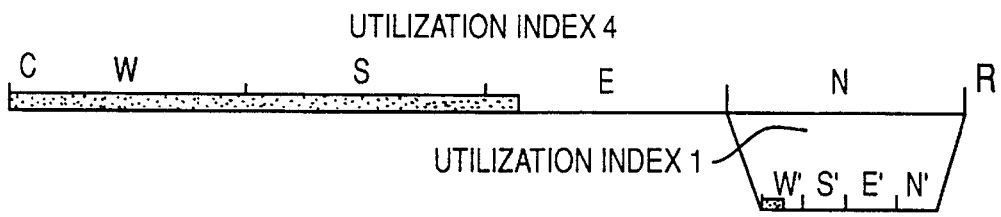
Figure 8D:
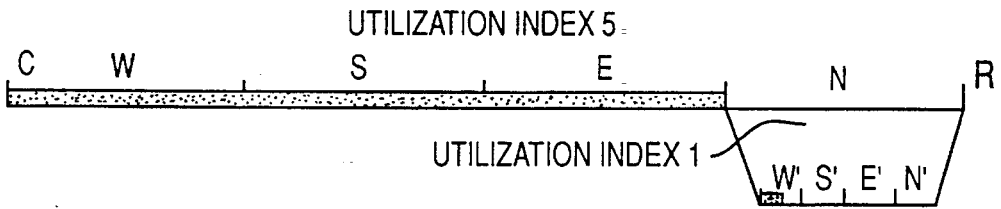
Figure 8E:
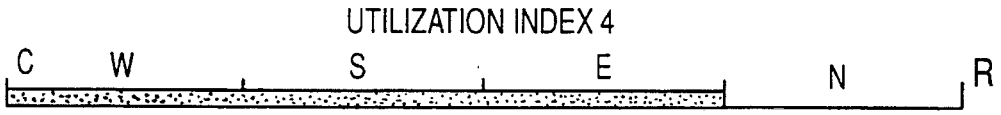
Figure 8F:
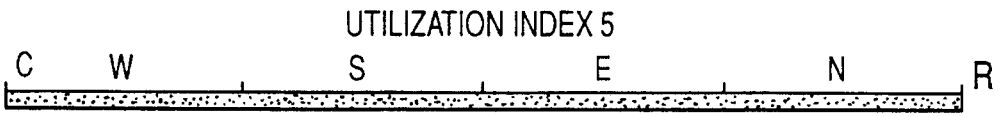

The center begins its growth in one of the peripheral regions (the west, in FIGS. 8, 9 and 10) until its growth is blocked, when the west is either entirely absorbed by the center (as shown in FIG. 8b), or is partitioned by another process (as shown in FIG. 9c, and FIGS. 10a through 10c). In that case, the center has overflowed.

There are three ways to expand a center region C that has overflowed, in order of preference:

1) Absorbing one of C's contiguous (or physically adjacent) sibling peripheral regions (as shown in FIGS. 8a thru 8f, as the center absorbs its western, southern, eastern, and northern sibling peripheral regions).

Figure 10A:
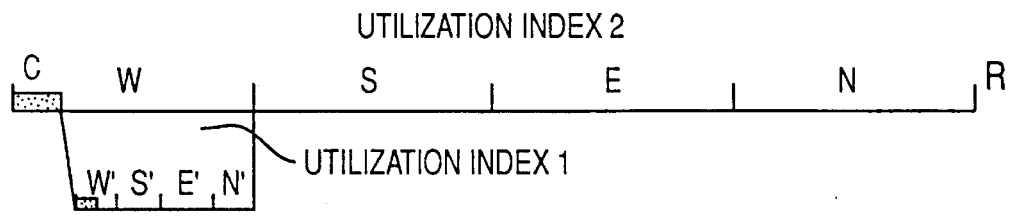
FIG. 10 illustrates the non-contiguous expansion of a memory region.
Figure 10B:
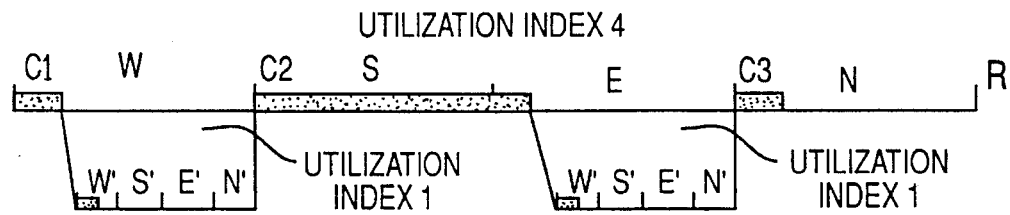
Figure 10C:
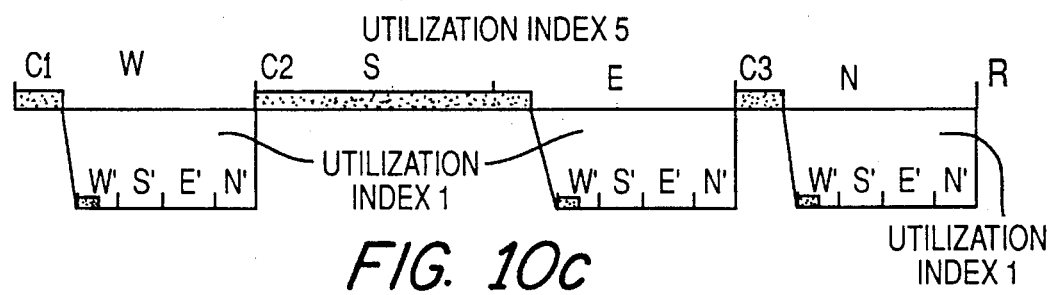
Figure 10D:
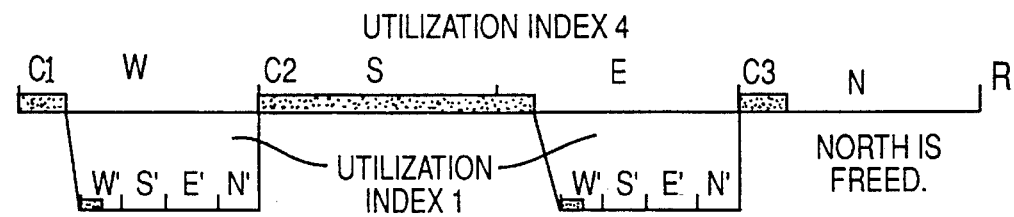
Figure 10E:
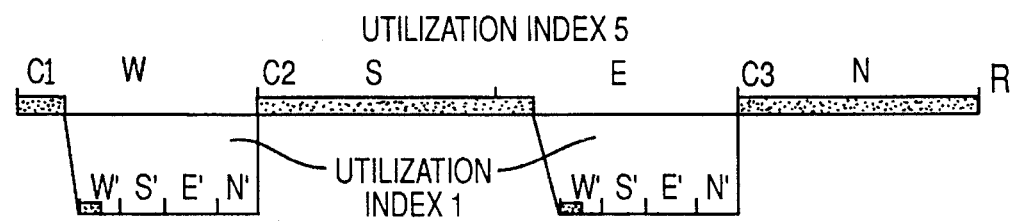
Figure 10F:
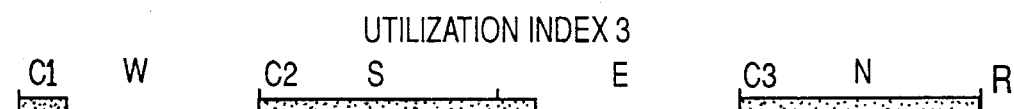

2) Specifying a local continuation to one of C's non-contiguous sibling peripheral regions (as shown in FIGS. 10b and 10c, where the center has begun a new fragment, C2, beginning in the south, and a new fragment C3, beginning in the north).

3) Specifying a remote continuation to some other region (this is illustrated in FIG. 9d, where south's center C' has begun a new fragment in a descendant region of its northern sibling N'). Since N' is already partitioned, one of its sub-regions must be used, in this case, the northern sub-region, N". However, N" cannot be used directly, since it is a peripheral region, so it must first be partitioned, and then its center sub-region, C''' is used for the continuation.

Absorption is the most desirable way to expand a center region, since its contiguity is preserved. If absorption is impossible (i.e., some other process has partitioned the adjacent sibling peripheral region, as in FIGS. 9c, 10a, or 10b), then the most desirable way to expand a region is via a local continuation to a non-contiguous sibling region. The center region then becomes divided into non-contiguous fragments, as shown in FIGS. 10b thru 10f, where the center is composed of fragments C1, C2, and C3. If a local continuation is impossible, then a continuation to a remote region S must be used, as in FIG. 9d (by invoking the search procedure described below, beginning with the dial controlling the center region), thereby allowing the center to continue its growth. This may sacrifice locality if the non-local region is far from the parent region R, perhaps even on another computer. The remote region S will either be outside of R, or inside one of R's (partitioned) peripheral sub-regions, as in FIG. 9d.

DIALS: THE KEY DATA STRUCTURE

Once a process P partitions a peripheral memory region R, P will create a dial D, and store D within R. The dial D will be stored at a fixed location within R (e.g., at the end of R). Dials consist of a map and a utilization index, and have two primary functions:

1) To contain the information needed to enable processes to address, reserve, partition, grow, shrink, and free memory regions.
2) To directly address memory, using relative addresses that are composed of a series of dial specifications that define a path through successively partitioned memory regions.

The Map

The dial map for a region R indicates sub-region locations, sizes, and offsets. The offsets specify how much memory has been actually used by R's center sub-region, which may be divided into up to 4 non-contiguous fragments within R's peripheral sub-regions, as illustrated in FIG. 10. In addition, the map indicates the location of the parent dial (the dial for the parent region containing R), thereby linking the dials in a chain.

The Utilization Index

The present invention balances the partitioning of memory, in order to avoid heavily partitioning some regions, while other regions remain lightly partitioned. The dial's utilization index, an integer ranging between 0 and 5, indicates the number of sub-regions that are actually in use within a given region R. If R's utilization index is zero, then R is free (and therefore un-partitioned). If R's utilization index is 1, then only one sub-region within R is in use. Typically this will be R's center sub-region, since the center sub-region is the first sub-region to be used. However, it may be the case that the only sub-region in use is a peripheral sub-region, since the center may have been in use previously, but since freed. Peripheral regions are not used (i.e., remain free) unless they are either partitioned, or are absorbed by their sibling center region. Center sub-regions are never partitioned. Allowing center regions to be partitioned would add significant complexity and overhead to the address translation mechanism, since the center already contains useful data that specifies addresses to be resolved relative to its original dial. Each time one of R's peripheral sub-regions is either partitioned, or entirely absorbed by R's center, R's utilization index will be incremented.

FIGS. 3a thru 3d illustrate utilization indexes. Initially, in FIG. 3a, R is free, and therefore has a utilization index of 0. FIG. 3b shows the effect of partitioning R into a center sub-region and four (free) peripheral sub-regions, resulting in a utilization index of one (because the center is being used). Every time one of the peripheral sub-regions is absorbed by the center or partitioned (and therefore used), the utilization index of R will be incremented. FIG. 3c shows that R's utilization index has reached the maximum of five, since each one of its peripheral sub-regions is in use (since they have all been partitioned). FIGS. 3b thru 3d also show the utilization indexes for other regions contained within R. FIGS. 8, 9, and 10 also illustrate how utilization indexes change as regions are absorbed, partitioned, and freed.

Figure 11A:
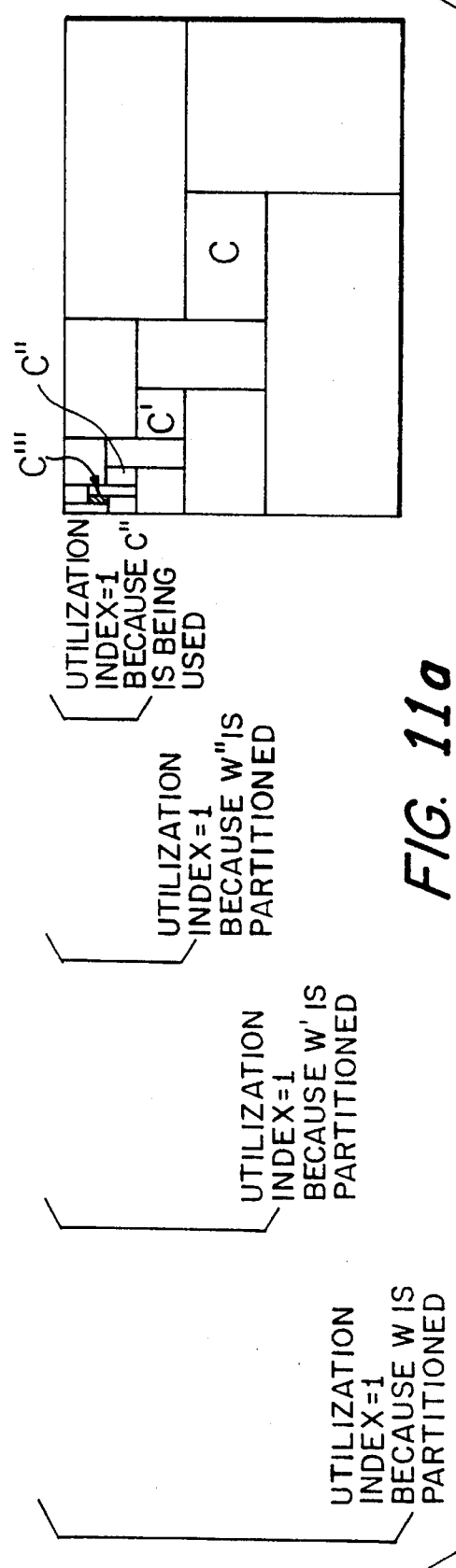
FIG. 11 illustrates how the freeing of memory regions may propagate.
Figure 11B:
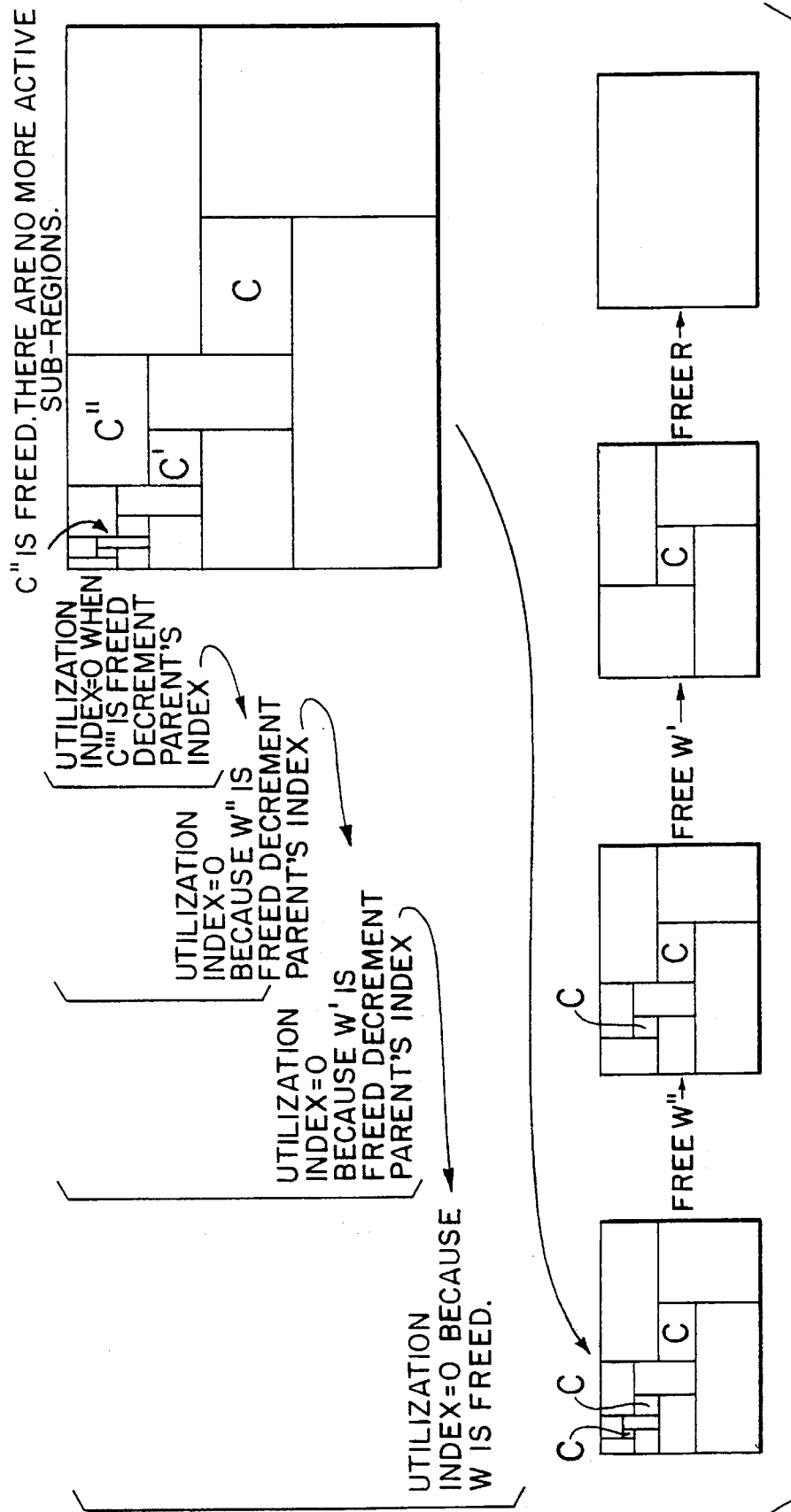

Partitioning or absorbing a sub-region only affects its parent region (increments the value of the parent's utilization index), and never affects non-local regions (such as its grandparent region). However, freeing a sub-region can, in certain cases, affect regions other than its immediate parent, including chains of grandparent and great-grandparent regions, etc. Each time one of R's previously used sub-regions (whether peripheral or center) is freed, R's utilization index will be decremented. If R's utilization index is decremented to 0, indicating that none of its sub-regions are in use, then R itself can be freed. If R is freed, then the utilization index of R's parent region will be decremented, and the freeing of regions may propagate, as shown in FIG. 11.

Locking

The process that uses a center region is considered to be the owner of that region, although other processes are allowed to read data in that region. A center region may be expanded by its owner, while other processes concurrently use its unaffected (unabsorbed) sibling regions. Once the owner frees the center region, it forfeits this claim to ownership. When a process terminates, it should automatically free any memory regions it owns. Peripheral regions, on the other hand, have no unique owner, since they contain sub-regions that may be concurrently partitioned by multiple processes. Therefore, only center regions may be owned by processes.

Portions of the dial (e.g., the dial map and utilization index) will be locked momentarily while a process modifies them (e.g., when partitioning, absorbing, or freeing a sub-region). When a center region absorbs a sibling region, the center's owner must first lock, then update that portion of the dial map which contains information about the sibling to be absorbed, as well as the dial's utilization index. When a process frees a region, it must momentarily lock, then decrement, the utilization index of its parent region. The dial is never locked when it is only being used as a mechanism for addressing data. The dial is only locked while it is being updated, not while "work" is being done in the memory it controls.

Dial-Based Relative Addresses

The present invention supports an arbitrarily expandable address space, where relative addresses are used to access data. A relative address A specifies how to navigate through layers of partitioned memory regions, beginning with the region R containing A. Relative addresses consist of series of region specifications, followed by an integer offset, that are resolved relative to the dial D controlling R. Each region specification denotes a dial for ancestor or descendant regions of R.

The five region specifications within relative addresses may be one of the following:

P, which means go to the parent dial (e.g., the string PPP means go to the dial for R's great-grandparent).

W (west), S (south), E (east), N (north), C (center), which means go to the indicated child dial (e.g., the string NSEC means go to the center of the east of the south of the north of R).

FIGS. 3b thru 3d illustrate relative addresses, resolved relative to region R. In FIG. 3b, the address of the grey-shaded region is "W". In FIG. 3c, the address of the grey-shaded region is "WS". In FIG. 3d, the address of the grey-shaded region is "WSW".

The grey-shaded regions in FIG. 3 could also have been addressed using addresses relative to some region other than R, such as region E (one of R's immediate sub-regions). In that case, the address of the grey-shaded regions in FIGS. 3b, 3c, and 3d would be "PW", "PWS", and "PWSW", respectively.

Relative addresses will typically be smaller than the addresses used by conventional computers (e.g., only 3 bits are needed to distinguish among the 5 region specifications).

THE ALGORITHM

Overview: Searching, Expanding and Freeing Memory Regions

The distributed memory management algorithm is performed by each of the multiple concurrent processes that use memory. There is no centralized memory controller, only processes that are direct users of memory. These processes perform three primary activities, which are described in the following sections, and are summarized in FIG. 12:

Search for free memory regions (and partition these regions if they are peripheral regions);

Write data into these regions (and expand these regions when they overflow);

Delete data from these regions (and free these regions when they become empty).

Searching For Free Memory Regions: Search Overview

Whenever a process P creates a new subprocess Q, P will search for a free memory region X, of size K or greater, to reserve for Q. The sizes of a region R's sub-regions can be determined by consulting R's dial D, and examining D's map, which indicates their sizes and locations. Alternatively, P may simply give Q a dial from where Q may begin its own search for a free region. In addition, there may be a variety of application-specific reasons why a process P may need to reserve additional memory regions for its own use. For example, P may need to specify a continuation to a new region when X overflows.

The result of this search is always a center region. For example, if the search finds a free peripheral region X that is large enough, then X will be partitioned, and X's center sub-region will be the actual region reserved.

The search procedure performs a depth-first search through memory (where R's descendants will be considered before considering R's siblings and their descendants), beginning with some peripheral region R (probably, but not necessarily, R is the parent region of a center region that P already owns). To preserve homogeneity, the initial region, consisting of the computer's available memory, is treated as a peripheral (therefore partitionable) region, whose center will be used by the computer's root process. A depth-first search is likely to find a region that is close to the original region R, thereby localizing the regions reserved by a process.

If the search fails, it will be attempted again, starting with R's parent region. Whenever a search fails, P may, of course, decide to search for smaller regions—e.g., two one-megabyte regions, instead of one two-megabyte region. If this second search fails, then it will be attempted yet again, starting with R's grandparent region, and so on. If all memory regions for the current computer are too small, the search will eventually examine memory regions that reside on other computers. Therefore, the directly addressable memory for each process spans the entire network of computers. The overall search fails only when the entire network of computers runs out of memory.

The search will be recursively invoked on successive memory regions. The utilization indexes for the regions controlled by the dial determine the order in which the dial's regions will be examined. All of these regions will be examined eventually, unless one of the regions (or its descendants) succeeds, in which case the search immediately terminates with success. The idea is to balance the utilization (and partitioning) of regions by examining less utilized regions before heavily utilized regions, in order to find the least utilized free region (within the depth-first search). Within a particular invocation of the search procedure, sub-regions will be considered in order of their utilization indexes, beginning with sub-regions that are free (i.e., having utilization index zero), and ending with sub-regions that are maximally utilized (i.e., having utilization index 5).

Note that multiple processes may concurrently search and reserve R's sub-regions. Also note that a single process may own multiple center regions.

Search Algorithm

Figure 13:
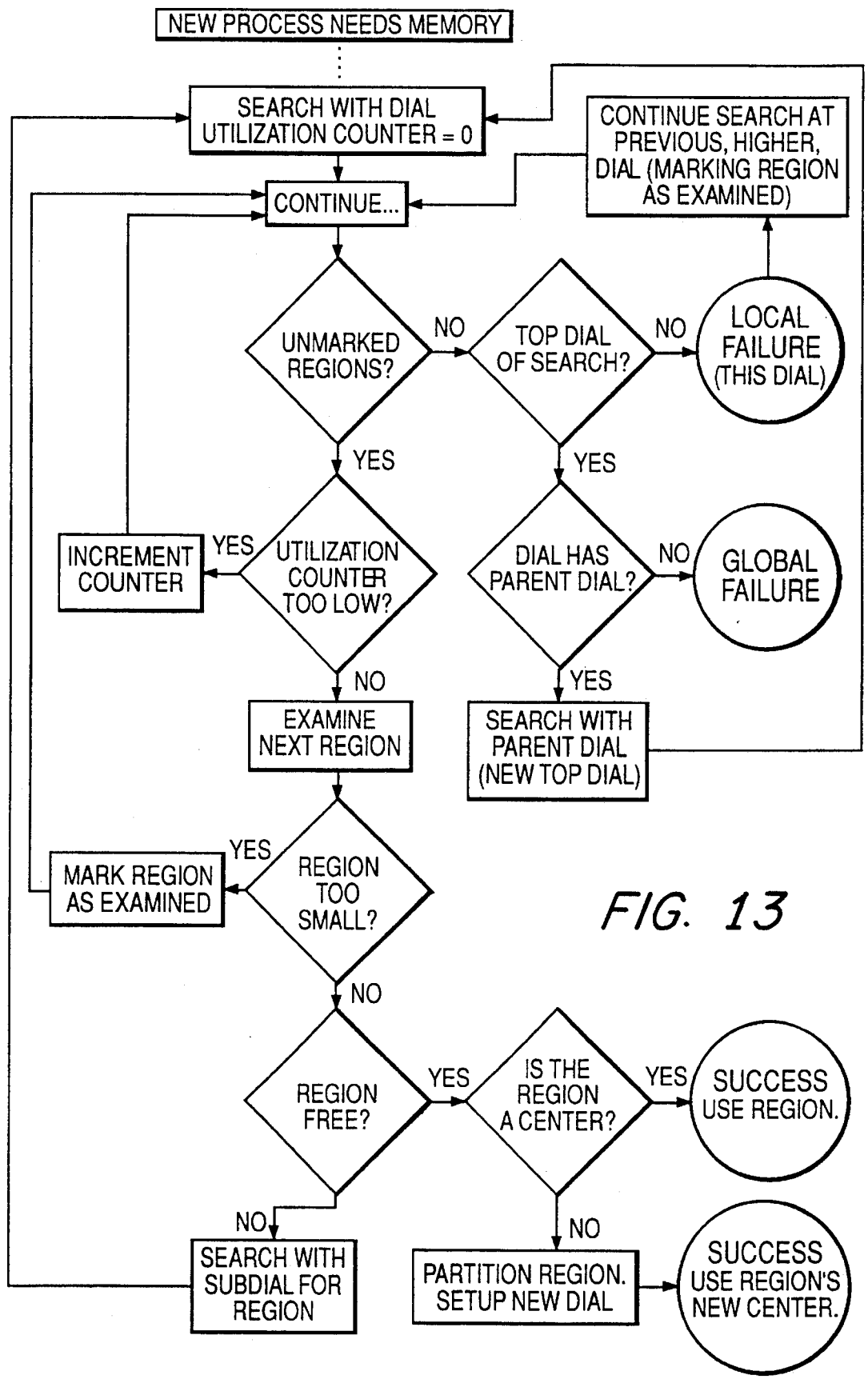
FIG. 13 is a detailed flow chart for the search algorithm of the present invention.

The recursive search procedure is described below, and illustrated in a flow chart in FIG. 13. The search procedure takes one argument: a dial D, controlling some region R. The search is recursive, resulting in a stack of successive searches that search successively deeper "inner" regions of memory. Once any inner search succeeds, the whole search is terminated with success. If an inner search fails, it will pass control back to a higher search, which will continue searching until the top dial used by the search (i.e., the initial dial of the search) is reached. If the search of the top dial fails, the search will be retried, this time using D's parent dial as the top dial.

Search (dial D)

1) Initialization: Set the utilization counter to 0.

2) Failure—No Unmarked Regions: If all sub-regions controlled by dial D have been examined without success, then the search terminates with failure.

a) Inner Loop Failure: If D was searched as a result of a previous recursive "inner" search (in Step 7 below), which searched D because D is a sub-dial of some other dial Z, then the search of dial Z will be resumed in Step 7a.

b) Network-Wide Failure: If D was the top dial used in the search, and D has no parent dial (i.e., D is the top dial for the entire network), then the entire, network-wide search terminates with failure.

c) Retry Search With Parent Dial: If D was the top dial used in the search, then the search will be retried, this time using D's parent dial as the top dial. As an optimization, an optional parameter could be passed in to the search procedure, indicating that dial D should not be examined again, since D has been already searched.

3) Utilization Counter Too Low? If all unexamined sub-regions have a utilization index higher than the utilization counter, then the utilization counter is incremented and the search continued using the current dial D's sub-regions by repeating Step 2.

4) Examine Next Sub-Region: The next unexamined sub-region X is then examined, controlled by dial D, whose utilization index is not greater than the utilization counter. If the center sub-region is free, it will be examined before examining the peripheral sub-regions. To preserve memory continuity (and thus reduce memory fragmentation), peripheral sub-regions that are furthest from the active center fragment (or furthest from the first peripheral sub-region, if the center has been freed), are explored before sibling regions that are adjacent or closer to this fragment are explored. This increases the likelihood that when the center expands (due to overflow, as described below), and tries to absorb a sibling region, it will find a physically contiguous region to absorb, thereby preserving the continuity of the center.

5) Region Too Small: If $|X|<K$ where the expression $|X|$ denotes the size of region X, then X is marked as examined, and the search continued using the current dial D's sub-regions by repeating Step 2.

6) Success—Free Region Found: If $|X|\geq K$ and X is free, the search has been a success.

a) Reserve a Free Center Region: If X is a center region, then P reserves X, assuming ownership of X.

b) Partition a Free Peripheral Region: If X is a peripheral region, then X must be partitioned (and the utilization index of X is set to 1). Then P reserves the center subregion of X. If the size of X is exactly K, then X's center subregion will be of size K, and X's peripheral sub-regions will of size 0.

In either case, the search terminates with success.

7) Recursively Search a Sub-Dial: If $|X|\geq K$, and X's utilization index is non-zero, then the sub-regions within X are searched using a recursive "inner" search procedure, using X's dial. This recursive search will result in one of two possible outcomes:

a) Inner Loop Failure: If the recursive search fails (in Step 2a above), then X is marked as examined, and the search is continued using dial D's sub-regions by repeating step 2.

b) Inner Loop Success: If the recursive search succeeds (in Step 6), P will reserve the appropriate region.

Expanding Center Regions to Handle Overflow

Once a process P has reserved a center region C, becoming its owner, it may write data into that region. Only center sub-regions will ever contain useful data (any useful data contained in a peripheral region X will actually reside in the center sub-region of X. The center begins its growth in one of the peripheral regions (the west, in FIGS. 8, 9, and 10) until its growth is blocked, when the west is either entirely absorbed by the center (as shown in FIG. 8b), or is partitioned by another process (as shown in FIG. 9c, and FIGS. 10a thru 10c). The center has overflowed. The center then tries to expand at the expense of its free sibling peripheral sub-regions.

There are three ways to expand a center region C that has overflowed, in order of preference:

1) Absorbing one of C's contiguous (or physically adjacent) sibling peripheral regions (as shown in FIGS. 8a thru 8f, as the center absorbs its western, southern, eastern, and northern sibling peripheral regions). FIG. 7 illustrates, in two dimensions, how a center sub-region, C, may absorb memory from its peripheral sibling regions. However, issues of contiguity are more easily understood using the one-dimensional representation of memory shown in FIGS. 8, 9, and 10. The map for the dial D controlling C's parent region will be updated to reflect the absorption. If a sibling of C is entirely absorbed, then the utilization index of D will be incremented.

2) Specifying a local continuation to one of C's non-contiguous sibling peripheral regions (as shown in FIGS. 10b and 10c, where the center has begun a new fragment, C2, beginning in the south, and a new fragment C3, beginning in the north). The dial map only needs to store the offsets for the center fragments, and not for the peripheral sub-regions, because these peripheral sub-regions will get their own maps if and when they are partitioned. The locations and sizes of the peripheral subregions can be computed from the locations, sizes, and offsets for the C1, C2, C3, and C4 fragments.

3) Specifying a remote continuation to some other region (this is illustrated in FIG. 9d, where south's center C' has begun a new fragment in a descendant region of its northern sibling N'). Since N' is already partitioned, one of its subregions must be used, in this case, the northern sub-region, N". However, N" cannot be used directly, since it is a peripheral region, so it must first be partitioned, and then its center sub-region, C''' is used for the continuation.

Absorption is the most desirable way to expand a center region, since its contiguity is preserved. If absorption is impossible (i.e., some other process has partitioned the adjacent sibling peripheral region, as in FIGS. 9c, 10a, or 10b), then the most desirable way to expand a region is via a local continuation to a non-contiguous sibling region. The center region then becomes divided into non-contiguous fragments, as shown in FIGS. 10b thru 10f, where the center is composed of fragments C1, C2, and C3. If a local continuation is impossible, then a continuation to a remote region S must be used, as in FIG. 9d (by invoking the search procedure described below, beginning with the dial controlling the center region), thereby allowing the center to continue its growth. This may sacrifice locality if the non-local region is far from the parent region R, perhaps even on another computer. The remote region S will either be outside of R, or inside one of R's (partitioned) peripheral sub-regions, as in FIG. 9d. The last memory location in C will specify a continuation that indicates where to find the dial for S.

Shrinking Memory Within a Region

The owner process P of a center region C may also delete data from that region. If C becomes empty (i.e., C no longer contains any useful data), then C is freed, and P relinquishes its ownership. The dial D controlling C's parent region R, will be updated to reflect the freeing of C, and the utilization index of D will be decremented. If D's utilization index becomes zero, indicating that none of its sub-regions are in use, then R will also be freed. If R is freed, then the utilization index of R's parent region will be decremented, and the freeing of regions may propagate, as shown in FIG. 11.

Network-Wide Memory Management

The algorithm described above can also be used to manage distributed memory over multiple computers, where each computer can reserve, partition, expand, shrink, and address memory regions residing on any computer in the network (e.g., that may "belong to" other computers). The trick is to give each computer an finite, yet arbitrarily expandable, address space. Each address space will be a center sub-region within a parent region containing an arbitrarily expandable address space.

For example, beginning with the initial network-wide address space I, the network manager process may reserve an address space in I's center sub-space that is more than adequate for one computer (e.g., four gigabytes). Since I's peripheral sub-spaces are arbitrarily large, they may be partitioned arbitrarily. Thus, the network-wide address space will be partitioned into layers of arbitrarily expandable address spaces.

Data never needs to be moved to new memory locations (unlike conventional systems) because the addresses (and address spaces) are guaranteed to be unique. In addition, the memory management system can always generate new unique address spaces (e.g., for new computers, as the network grows) between existing address spaces, since its address spaces are arbitrarily expandable (the relative addresses are arbitrarily long sequences of dial specifications). Computers will be arranged in a parent-child relationship using the search algorithm, where each computer may have up to five child computers. When computers are removed from the network, their address spaces are freed, and become available for use by new or existing computers. Note that a computer cannot be removed unless all of its child computers have already been removed.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A distributed memory system for a computer system having means for concurrently executing a plurality of processes comprising:
   (a) a memory;
   (b) means for dynamically partitioning the memory into variable-size regions, each region including a central subregion and at least four sibling peripheral subregions, and means for further subdividing each peripheral subregion into a center subregion and at least four sibling subregions;
   (c) means for allocating each central subregion to a specific concurrently executing process; and
   (d) means within each region for dynamically controlling memory use within that region and for directly addressing memory locations without requiring any relocation of data.

2. The distributed memory system of claim 1, further comprising means located within each region for locating free subregions of memory.

3. The distributed memory system of claim 2, wherein the means located within each region for locating free regions of memory further comprises means for addressing memory regions.

4. The distributed memory system of claim 3, wherein the means for addressing memory regions further comprises means for enabling processes to reserve memory regions.

5. The distributed memory system of claim 4, wherein the means for controlling memory use within regions further comprises means for expanding, shrinking and freeing the memory regions allocated to each concurrently executing process.

6. The distributed memory system of claim 5, wherein the means for addressing memory regions uses relative addresses that define a path through the layers of partitioned memory regions allocated to each concurrently executing process.

7. The distributed memory system of claim 5, wherein the means for addressing memory regions further comprises means for determining how each region is to be utilized.

8. The distributed memory system of claim 1, wherein the central subregion further comprises means for expanding the central subregion allocated to each concurrently executing process by allocation of sibling peripheral subregions to the central subregion.

9. The distributed memory system of claim 8, wherein the central subregion further comprises means for specifying a local continuation to one of the central subregion's sibling peripheral subregions.

10. The distributed memory system of claim 9, wherein the central subregion further comprises means for specifying a remote continuation to a remote region.

11. The distributed memory system of claim 8, further comprising means for determining how each memory subregion is to be utilized.

12. A method for managing a computer system having a memory and means for concurrently executing a plurality of processes comprising:
   (a) dynamically partitioning the memory into variable-size regions each region having a center subregion and at least four sibling peripheral subregions, and further subdividing each peripheral subregion into a center subregion and at least four sibling subregions;
   b) allocating each central subregion to a specific concurrently executing process; and
   (c) controlling the use of memory witch each region,
wherein each concurrently executing process controls the use of memory within the central subregions allocated to that process.

13. The method of claim 12, further comprising locating free regions of memory within a region.

14. The method of claim 13, further comprising directly addressing memory regions and reserving memory regions.

15. The method of claim 14, further comprising expanding, shrinking and freeing the memory regions allocated to each specific process.

16. The method of claim 14, wherein the step of addressing memory regions comprises defining a path through layers of partitioned memory regions.

17. The method of claim 12, further comprising expanding the central subregion allocated to each concurrently executing process by allocation of sibling peripheral subregions to the central subregion.

18. The method of claim 12, further comprising specifying a local continuation to one of the central subregion's sibling peripheral subregions.

19. The method of claim 12, further comprising specifying a remote continuation to a remote region.

20. A computer system having a memory comprising:
(a) means for dynamically partitioning the memory into a plurality of variable-size regions;
(b) means for allocating each region to a separate concurrently executing process;
(c) means for dynamically partitioning each region into one central subregion and at least four sibling peripheral subregions, and means for further subdividing each peripheral subregion into a center subregion and at least four sibling subregions;
(d) means within each region for controlling memory use within that region; and
(e) means for each concurrently executed process to write data to the region allocated to that process, and to delete data from the region allocated to that process.

21. The computer system of claim 20, wherein the means for controlling memory use with each region comprises means for directly addressing memory locations within that region.

22. The computer system of claim 21, wherein each central subregion further comprises means for allocating sibling peripheral subregions to the central subregion.

23. The computer system of claim 22, wherein each central subregion further comprises means for expanding by locating free memory within a sibling peripheral subregion.

24. The computer system of claim 23, wherein each central subregion comprises means for expanding by locating free memory in a remote region.

25. The computer system of claim 20, further comprising means for determining the utilization of each region.

26. The distributed memory system of claim 1, wherein each central subregion is not contiguous to any other central subregion.

27. The distributed memory system of claim 1, wherein the same number of peripheral subregions exist in every subdivision of the memory which uses peripheral subregions.

* * * * *